J. H. BRIMSON.
VARIABLE SPEED MECHANISM.
APPLICATION FILED MAR. 6, 1915.
1,187,493.
Patented June 20, 1916.
3 SHEETS—SHEET 1.
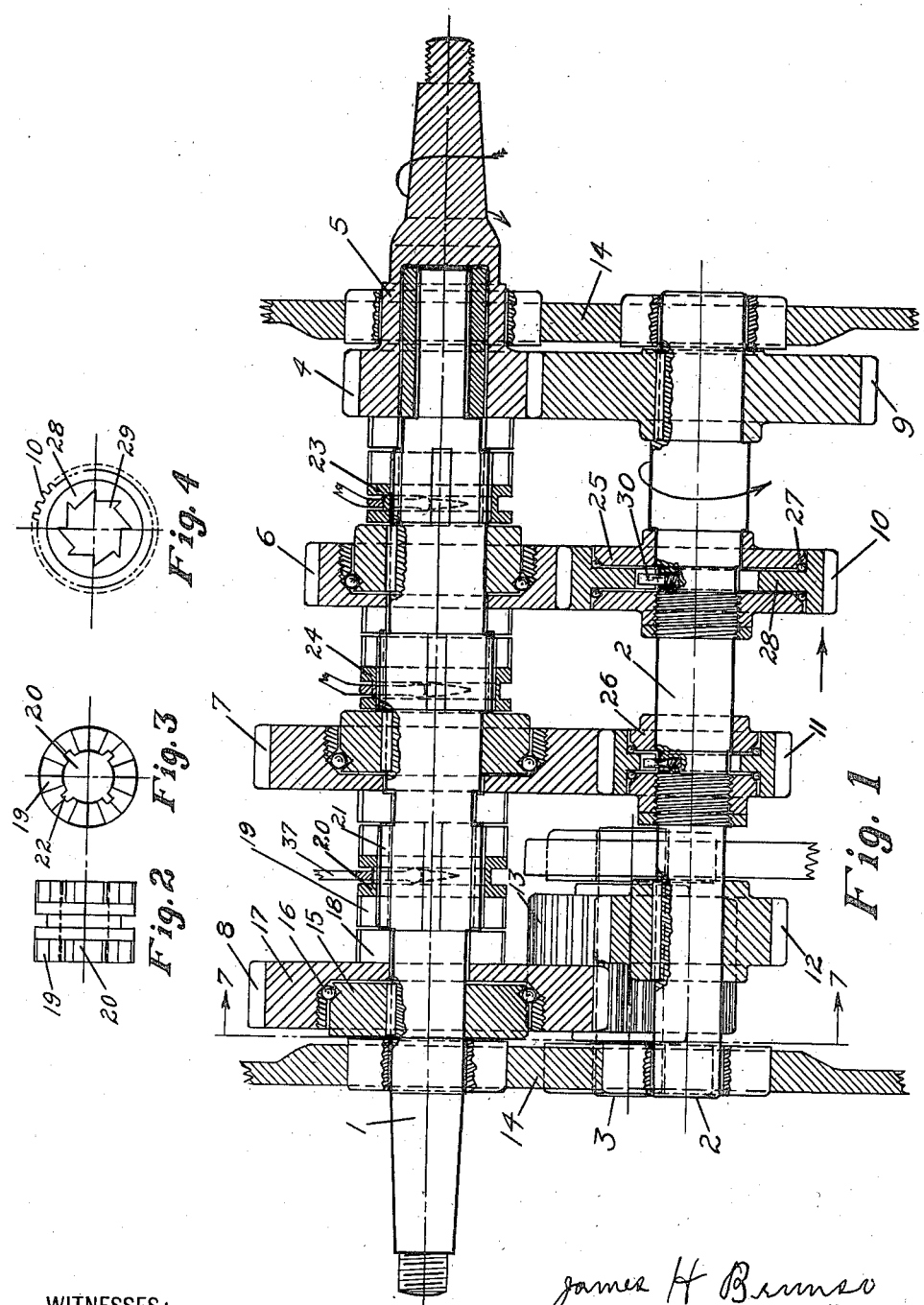
WITNESSES:
INVENTOR
BY
ATTORNEY J. H. BRIMSON.
VARIABLE SPEED MECHANISM.
APPLICATION FILED MAR. 6, 1915.
1,187,493.
Patented June 20, 1916.
3 SHEETS—SHEET 2.
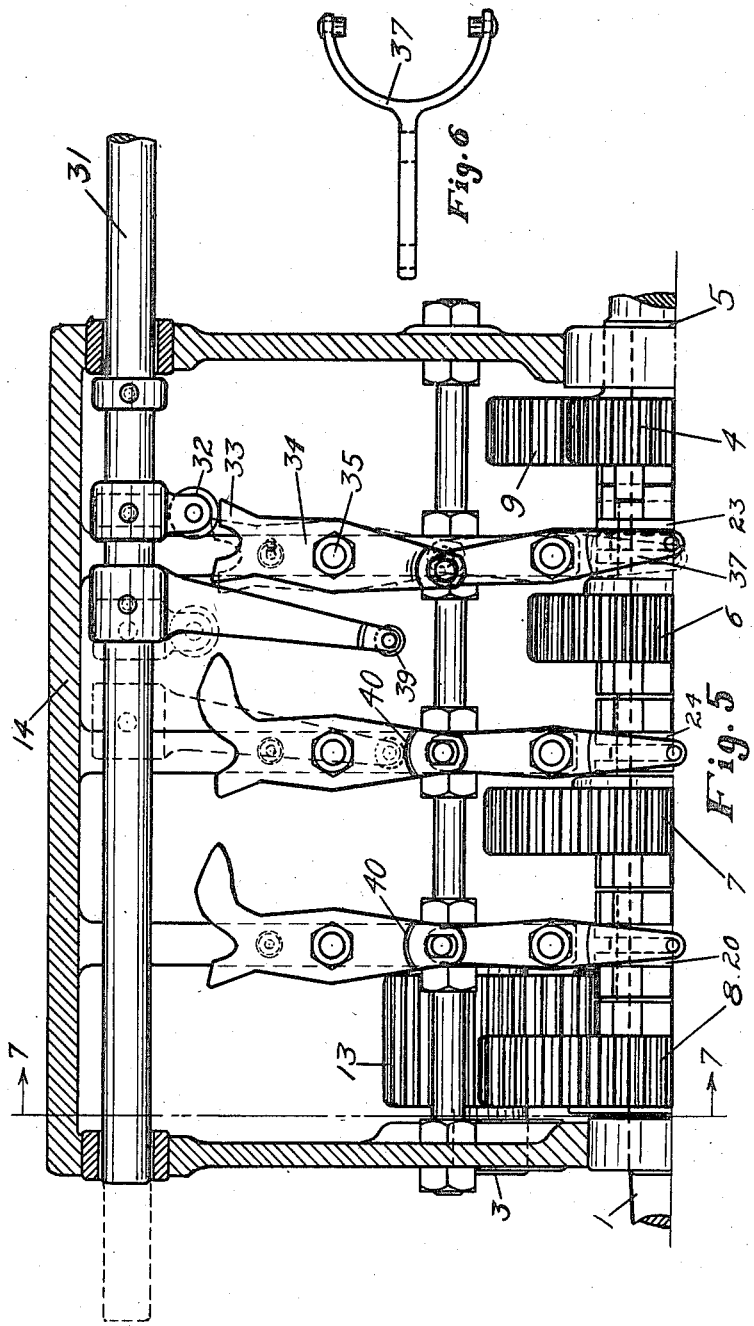

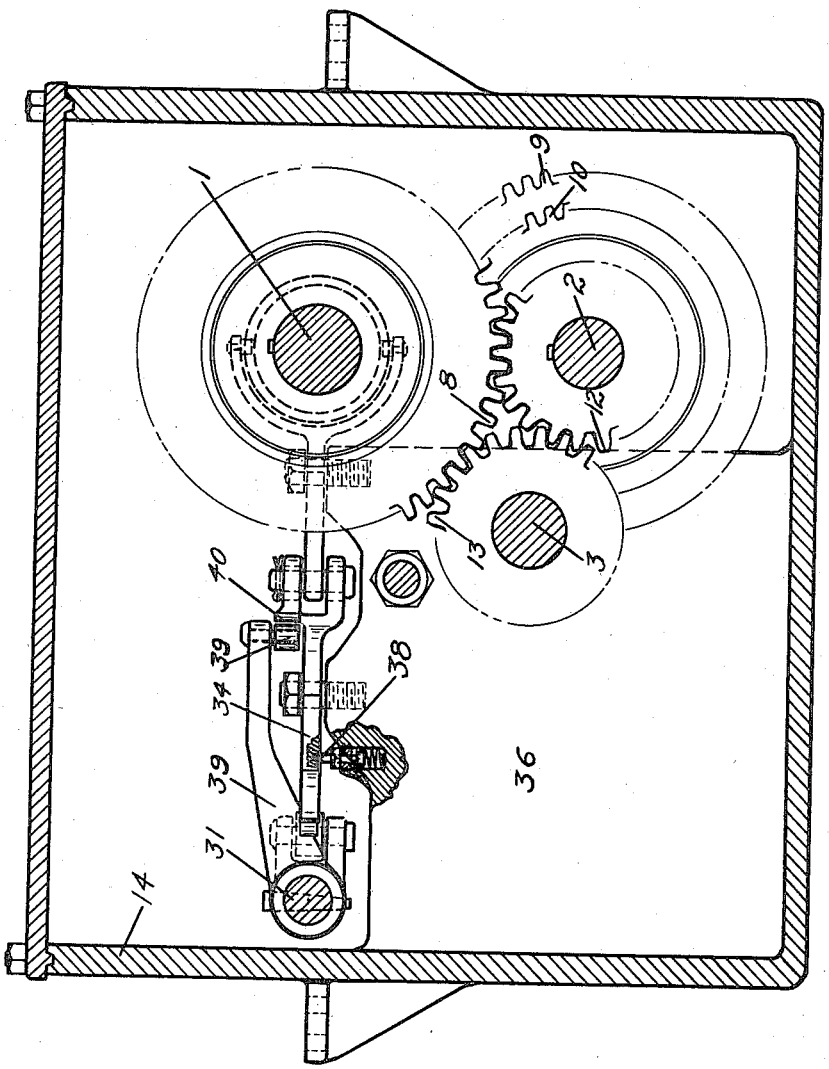

UNITED STATES PATENT OFFICE.

JAMES H. BRIMSON, OF SAGINAW, MICHIGAN, ASSIGNOR OF ONE-HALF TO WILLIAM H. HART, OF SAGINAW, MICHIGAN.

VARIABLE-SPEED MECHANISM.

1,187,493.                Specification of Letters Patent.     Patented June 20, 1916.

Application filed March 6, 1915. Serial No. 12,606.

*To all whom it may concern:*

Be it known that I, JAMES H. BRIMSON, a citizen of the United States, residing at Saginaw, in the county of Saginaw and State of Michigan, have invented certain new and useful Improvements in Variable-Speed Mechanism; and I do hereby declare the following to be a full, clear, and exact description of the invention, such as will enable others skilled in the art to which it appertains to make and use the same.

This invention relates to change speed gears and transmissions such as are commonly employed in the transmission mechanism of automobiles and like machines, in which a number of speeds ahead are required and one or more speeds to reverse.

The objects of my invention are, first, to provide a change speed gear in which the speed is changed by throwing gears of different speed ratios into and out of operation, but so constructing the mechanism that the teeth of the gears are not disengaged or slid into mesh when change of speed occurs, thus saving wear on the teeth and reducing liability of breakage.

A further object is to provide a change speed device in which all the gears are rotating all of the time when the machine is in operation, so that shift from one speed to another may be made while the gears are in motion, it being unnecessary to start a gear from rest when a shift in speed is to be made.

A still further object is to provide means in a change speed mechanism of the class described whereby the shifting from one speed to another, as from high to low, may be accomplished without throwing out the main clutch, that is, without disconnecting the engine from the driven shaft. I am also enabled by this means to change the speed from high to low without shifting the clutch and with only a slight change in the speed of the engine, this change being easily made by means of the accelerator with which automobiles are commonly provided.

A still further object is to provide a change speed device in which all of the various speeds may be attained by operating a single lever, the distance forward or back that the lever is moved controlling the selection of the proper gears corresponding to the various desired speeds.

My improvement enables the change of gear ratios to be made while the engine is driving the car at fast speed (direct connected), allowing the car to "coast" until its speed is reduced to correspond to the speed of the "slow" gear, when the slow gear automatically picks up its connection with the driven shaft and thereafter propels the car on slow speed. Similarly, shift from any higher speed to any lower speed may be accomplished without disengaging the clutch.

With these and certain other objects in view which will appear later in the specification, my invention consists in the devices described and claimed and the equivalents thereof.

In the drawings, Figure 1 is a part vertical section through the transmission gears. Fig. 2 is a side view of one of the sliding clutch members by which the various gears are thrown into and out of operation. Fig. 3 is an end view of the same. Fig. 4 is a diagrammatic end view of one of the idler gears as viewed from the direction of the arrow in Fig. 1. Fig. 5 is a part sectional plan view of the gear shifting device, showing the parts in the position they occupy when in high speed. Fig. 6 is a detail of the clutch shifting fork. Fig. 7 is an enlarged transverse section on the line 7—7 of Figs. 1 and 5.

As is shown in the drawings, the device consists in a main shaft 1, countershaft 2 and idler shaft 3, upon which proper gears are mounted.

At one end of the main shaft and mounted to revolve loosely thereon is a drive gear 4 having a quill hub 5, to which the driving power may be applied in any suitable manner. Upon shaft 1 are loosely mounted a plurality of gears, each gear being capable of revolving independently of shaft 1, as on a journal. Any desired or convenient number of gears of various diameters may be employed, but for purpose of illustration I have shown three such gears, of which 6 is the intermediate speed gear, 7 the slow speed gear, and 8 the reverse gear. The manner in which these gears are actuated will be described later.

The countershaft 2 carries a gear 9 that meshes with gear 4 and a gear 10 that meshes with gear 6; also a gear 11 meshes with gear 7 and a gear 12 meshes with a pinion 13 having a face double the width of the face of gear 12 and fixed to the idler shaft 3 which is revolubly mounted in suitable bearings in the gear case 14. Gears 10 and 11 on shaft 2 are mounted to revolve freely in one direction, but are locked to shaft 2 when revolving in the opposite direction, and gears 9 and 12 are fixed to shaft 2. Pinion 13 meshes with the reverse gear 8 on shaft 1.

When gear 4 is rotated by the motor or other source of power, it rotates gears 10, 11 and 12, and these gears respectively rotate the loose gears 6 and 7 in one direction, and gear 8 (through pinion 13) in the opposite direction.

Since shaft 1 is revolved within the quill 5 and since all of the gears 4, 6 and 7 are revolved on the shaft 1, being mounted on ball bearings, the construction of which will presently be explained, no power will be transmitted by shaft 1 until one or the other of the gears 4, 6, 7, or 8 is locked to the shaft 1. The means by which any one of these gears may be locked to the shaft while all of the others remain loose, and the manner of mounting the freely revolving gears on the shafts, will now be described.

Referring to Fig. 1, it will be seen that gear 8, for example, is mounted on a hub 15 fixed to shaft 1, the periphery of the hub being formed with a suitable race for balls 16. The gear 8 is recessed to receive the hub 15 and is formed with a complementary ball race 17. The bore of the hub of gear 8 is preferably out of contact with shaft 1, the gear being free to revolve on the ball bearing. The hub of the gear is preferably formed with a number of laterally projecting clutch jaws 18 adapted to be engaged by corresponding jaws 19 of a sliding clutch 20, which is longitudinally movable for a short distance along shaft 1 and is prevented from rotating relatively to the shaft by suitable keys 21 received in keyways 22 of the clutch 20. Similarly gears 4, 6 and 7 are provided with clutch jaws adapted to be engaged by the corresponding jaws of sliding clutches 23, 24 and 20 respectively.

Gears 10 and 11 are revolubly mounted on hubs 25 and 26 by means of suitable ball bearings 27 similar in construction to the bearings of gear 8. The hubs 25 and 26 are preferably formed in two parts to receive between them the central web 28 of gear 10. The inner periphery of web 28 is formed with ratchet teeth 29 adapted to be engaged by the outwardly projecting end of a spring pressed pin 30, which acts as a pawl to allow gear 10 to revolve freely in one direction with relation to shaft 2, but to be locked thereto when revolved in the opposite direction.

The means by which shifting from high speed to any lower speed is accomplished without operating either the main clutch or disconnecting the engine from the main shaft 1, or without operating the brake of the car to reduce its speed to the corresponding speed of the slower gear will now be described.

Assuming that the engine has been driving the car direct connected, that is, with the main shaft 1 revolving at the full speed of the engine and assuming that it is desired to change from this high speed to the lowest speed, the low speed gear is first locked to shaft 1 by shifting clutch 20 until its jaws engage the jaws of gear 7. Gear 7 has been revolving freely with relation to shaft 1, having been propelled by gears 4 and 9, shaft 2 and gear 11; but when clutch 20 is shifted to lock gear 7 to shaft 1, gear 7 immediately picks up the speed of shaft 1, that speed being faster than the speed at which it had been propelled by gear 11. The speed of gear 11 is, therefore, accelerated and it begins to turn faster than the shaft 2 upon which it is mounted. The pawls 30 and ratchet teeth 29 permit this faster speed of gear 11. The car itself is assumed to be traveling at a rate corresponding to high speed and the main shaft 1 is of course revolving at a corresponding rate. The car, therefore, travels forward under its own momentum while the engine is revolving shaft 2 at a slower rate, corresponding to slow speed. When the speed of the car is dropped until the speed of shaft 1 corresponds to the speed at which shaft 2 is being driven, the pawls will engage the ratchet teeth and thereupon the engine begins to drive the car at slow speed. In a similar manner any other speed can be thrown in while the car is traveling at high speed without the necessity of disengaging the main clutch of the engine, and at any lower speed the car will automatically pick up as soon as its speed has dropped to that of shaft 2 and this action will take place without any jar or shock. Similarly the gears corresponding to any higher speed can be picked up from any lower speed by merely shifting the clutches and the higher speed will be picked up without jar if the speed of the car is first increased by using the accelerator in the usual well-known manner.

It is one of the objects of my invention, as has already been stated, to provide means whereby the shifting and disengaging of the various gears may be accomplished by employing only one shifting rod. The means by which I accomplish this result is illustrated in Figs. 1, 5, 6 and 7, where 31 is the shifting rod slidably mounted in suitable bearings in the case 14. The rod may be moved longitudinally by any suitable means, not shown. Fixed to rod 31 is a wiper 32 which is adapted to engage the ends 33 of a lever 34 which is pivotally secured by a bolt 35, or otherwise, to the web 36 of case 14. The other end of lever 34 is pivotally secured to one end of a clutch fork 37 which is also pivotally mounted on the web 36, the other end of the clutch fork being adapted to engage the corresponding clutch as 20, 23 or 24. When wiper 32 travels across the end 33 of lever 34 the corresponding clutch is actuated to shift lengthwise of the shaft 1 and throw the clutch either into or out of engagement with the corresponding gear 4, 6, 7 or 8.

Referring to Fig. 5, it will be seen that when rod 31 is driven as far as possible to the right, corresponding to the position of high speed, the lever 34 is locked in position to hold clutch 23 into engagement with gear 4. When rod 31 is pushed to the left, wiper 32 actuates lever 34 to withdraw the clutch 23 from engagement with gear 4, which corresponds to neutral position. The spring-pressed stop pin 38 engages the under side of lever 34, as shown in Figs. 5 and 7, to normally hold the lever in either one of its adjusted positions while permitting it to be displaced by movement of wiper 32. When the shifting rod 31 is pushed still farther to the left in Fig. 5, it engages the cam-shaped end of the next pivoted lever and throws clutch 24 into engagement with intermediate gear 6. Further movement of rod 31 throws the clutch out of engagement with gear 6. Similarly movement of rod 31 to the extreme left in Fig. 5 first locks gear 7 to shaft 1, then restores the clutch to its released position, and then locks gear 8 to shaft 1, the movement of the clutches being of course fixed by the shape of the cam faces which are successively engaged by the wiper 32.

The reverse movement of wiper 32, that is, movement toward the right in Fig. 5, will of course result in a reverse sequence of operations of the clutches, that is to say, the gear positions will be those of reverse, slow speed, intermediate speed and high speed.

To successively restore each set of gears to neutral position before the next set of gears is thrown into engagement by the wiper, I provide on the rod 31 a second wiper 39 adapted to engage the outwardly projecting cam shaped end 40 of the clutch fork, as shown by dotted lines in Fig. 5. When the clutch form is in neutral position, the wiper 39 can travel past without actuating the clutch, but if the clutch fork is in the position of engagement with a gear, the passing of wiper 39 will restore the clutch to neutral position.

By the means above described I have produced a simple and compact change speed device which is adapted by the movement of a single shifting rod to throw into or out of operation any set of gears corresponding to any desired speed. The arrangement and combination of the parts is such that the shift from any higher speed to any lower speed can be automatically made without jar or shock and without the necessity of operating the main clutch of the engine.

Having thus described my invention, what I claim and desire to secure by Letters Patent is:

1. In a change speed device, the combination of a main shaft, a counter shaft, gears on said counter shaft, gears revolubly mounted on said main shaft and meshing respectively with the gears of the counter shaft, a plurality of clutches adapted to engage respectively with the gears on the main shaft, a pivotally mounted fork engaging each clutch, a pivotally mounted lever having one end pivoted to the free end of said fork, a slidable rod and a wiper on said rod adapted to successively engage the ends of said lever to actuate said clutches in sequence, for the purposes set forth.

2. In a change speed device, the combination of a main shaft, a counter shaft, gears on said counter shaft, gears revolubly mounted on said main shaft and meshing respectively with the gears of the counter shaft, a plurality of clutches adapted to engage respectively with the gears on the main shaft, a longitudinally movable rod, a wiper carried by said rod, a pivotally mounted lever having one end adapted to be engaged by said wiper, a pivoted clutch fork, one end of said fork engaging a clutch and the other end pivoted to an end of said lever, and means releasably engaging said lever to normally hold the lever in its set positions.

3. In a change speed device, the combination of a main shaft, a counter shaft, gears on said counter shaft, gears revolubly mounted on said main shaft and meshing respectively with the gears of the counter shaft, a plurality of clutches adapted to engage respectively with the gears on the main shaft, a longitudinally movable rod, a wiper carried by said rod, a pivotally mounted lever having one end shaped to form a cam and adapted to be engaged by said wiper, a pivoted clutch fork having one end in engagement with a clutch and having its other end shaped to form a cam, said fork pivoted to an end of said lever, and a second wiper mounted on said rod and adapted to engage the cam-shaped end of said clutch fork.

In testimony whereof, I affix my signature in presence of two witnesses.

JAMES H. BRIMSON.

Witnesses:
  NELLIE M. ANGUS,
  JOSEPH V. CARPENTER.